United States Patent
Cha et al.

(10) Patent No.: US 9,834,068 B2
(45) Date of Patent: Dec. 5, 2017

(54) SUN VISOR FOR VEHICLE

(71) Applicant: Hyundai Motor Company, Seoul (KR)

(72) Inventors: Seung Kwon Cha, Yongin-si (KR); Dae Ik Jung, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 455 days.

(21) Appl. No.: 14/473,710

(22) Filed: Aug. 29, 2014

(65) Prior Publication Data

US 2015/0165879 A1    Jun. 18, 2015

(30) Foreign Application Priority Data

Dec. 18, 2013  (KR) .......................... 10-2013-0158753

(51) Int. Cl.
*B60J 3/00* (2006.01)
*B60J 3/02* (2006.01)
*B60R 7/05* (2006.01)

(52) U.S. Cl.
CPC .......... *B60J 3/0265* (2013.01); *B60J 3/0239* (2013.01); *B60J 3/0282* (2013.01); *B60R 7/05* (2013.01)

(58) Field of Classification Search
CPC ...... B60J 3/0252; B60J 3/0265; B60J 3/0239; B60J 3/0282; B60R 7/05
USPC .......... 296/97.8, 97.9, 97.11, 97.12; 359/844
See application file for complete search history.

(56) References Cited

U.S. PATENT DOCUMENTS

| | | | | |
|---|---|---|---|---|
| 4,390,202 A | * | 6/1983 | Flowerday | B60J 3/0252 160/DIG. 3 |
| 4,489,974 A | * | 12/1984 | Warhol | B60J 3/0265 16/337 |
| 5,139,303 A | * | 8/1992 | Miller | B60J 3/0265 296/97.12 |
| 5,383,700 A | * | 1/1995 | Agro | B60J 3/0265 296/97.12 |
| 5,564,772 A | * | 10/1996 | Miller | B60J 3/0265 296/97.12 |
| 6,139,083 A | * | 10/2000 | Fischer | B60J 3/0252 296/97.11 |
| 6,273,489 B1 | * | 8/2001 | Viertel | B60J 3/0217 296/97.9 |
| 8,562,061 B2 | * | 10/2013 | Asai | B60J 3/0217 296/97.12 |
| 2001/0050493 A1 | * | 12/2001 | Welter | B60J 3/0239 296/97.5 |

(Continued)

FOREIGN PATENT DOCUMENTS

| | | | |
|---|---|---|---|
| DE | 4234760 | * | 4/1984 |
| JP | H06-45810 U | | 6/1994 |

(Continued)

*Primary Examiner* — Ricky D Shafer
(74) *Attorney, Agent, or Firm* — Morgan, Lewis & Bockius LLP

(57) ABSTRACT

A sun visor for a vehicle may include a plate-like body portion having a predetermined thickness, a pivot arm wherein a first end thereof may be secured to a vehicle body and a second end thereof may be joined through an upper side of the body portion in a length direction at a section which may be cut in a length direction to form a cut section, a clamp which may be connected sideways to the vehicle body and may be shaped to wrap the pivot arm, an elastic member provided on an upper side of the clamp to compress the pivot arm when the body portion rotates.

10 Claims, 3 Drawing Sheets

(56) References Cited

U.S. PATENT DOCUMENTS

| | | | | |
|---|---|---|---|---|
| 2009/0134657 A1* | 5/2009 | Asai | ............. | B60J 3/0239 |
| | | | | 296/97.11 |
| 2009/0200828 A1* | 8/2009 | Welter | ............. | B60J 3/0265 |
| | | | | 296/97.12 |
| 2010/0001548 A1* | 1/2010 | Okazaki | ............. | B60J 3/0265 |
| | | | | 296/97.2 |
| 2015/0165877 A1* | 6/2015 | Cha | ............. | B60J 3/0252 |
| | | | | 296/97.5 |

FOREIGN PATENT DOCUMENTS

| | | | |
|---|---|---|---|
| JP | 2003-182364 A | | 7/2003 |
| JP | 2003-267048 | * | 9/2003 |
| KR | 20-2010-0003528 U | | 4/2010 |
| KR | 10-2012-0061679 A | | 6/2012 |
| KR | 20-2013-0004665 U | | 7/2013 |

* cited by examiner

SUN VISOR FOR VEHICLE

CROSS-REFERENCE TO RELATED APPLICATION

The present application claims priority to Korean Patent Application No. 10-2013-0158753, filed on Dec. 18, 2013, the entire contents of which is incorporated herein for all purposes by this reference.

BACKGROUND

Field of the Invention

The present invention relates to a sun visor for a vehicle in which a support structure for a clamp, which is installed to a sun visor for a vehicle and coupled to a pivot arm that is hinged to the vehicle headliner, is improved thereby to minimize the deflection of the sun visor and the flow of the clamp.

Description of Related Art

Generally, the interior of a vehicle contains different kinds of various convenience devices or equipment, which are positioned in locations comfortable for use by a passenger. Among these, a sun visor is provided as a sunlight cover for front-seat passengers by partially blocking the sun's rays from entering the interior space of a vehicle through windshield or side door glass (hereinafter referred to as "side window").

This type of sun visor is usually stored in a folded position within close contact to the interior headliner and unfolded from the headliner to be rotated in the direction of radiant sunshine to block the light when sunlight enters the interior of the vehicle.

A conventional art discloses a sun visor for a vehicle including, a clamp through which a pivot arm installed pivotally in a vehicle interior is arranged to pass. a bracket to which the clamp is fixed wherein the clamp includes a cover to wrap and support the pivot arm and a plate spring, inserted in the cover, a lower end of which is fixed and an upper end of which supports elastically the pivot arm, wherein the plate spring includes, a support portion that supports the pivot arm while it is moved up/downwardly inside the cover, a first elastic portion that is bent downwardly on both sides of the support portion, a second elastic portion that is bent downwardly at the end of the first elastic portion, a third elastic portion which is bent upwardly at the end of the second elastic portion and the ends of which are formed as free ends.

However, regarding the above vehicle sun visor, the clamp wrapped around the support shaft of the sun visor and the rotating shaft for rotating the sun visor are formed in the inside of the sun visor and thus a thickness of the sun visor is increased, which results in a reduction of headroom space Therefore, it is necessary develop a sun visor for a vehicle with a reduced thickness capable of satisfying aesthetic trends in coupe design while still additionally securing the interior space of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a sun visor with a reduced thickness capable of satisfying aesthetic trends in coupe design while still additionally securing the interior space of the vehicle.

In an aspect of the present invention, a sun visor for a vehicle may include a plate-like body portion having a predetermined thickness, a pivot arm wherein a first end thereof is secured to a vehicle body and a second end thereof is joined through an upper side of the body portion in a length direction at a section which is cut in a length direction to form a cut section, a clamp which is connected sideways to the vehicle body and is shaped to wrap the pivot arm, an elastic member provided on an upper side of the clamp to compress the pivot arm when the body portion rotates.

The pivot arm is joined through a lower side of the clamp to space the body portion from the vehicle body by a predetermined distance.

The clamp is coupled to a first side of the pivot arm, and a wing unit extending downwardly is formed on a second side of the pivot arm to support the body portion when the body portion rotates around the pivot arm.

Wing units are formed on both side surfaces of the body portion, respectively. The sun visor may further include supporters having a plate shape provided inside the clamp and mounted on upper and lower sides of the elastic member, wherein one of the supporters are selectively engaged to the cut section of the pivot arm.

A cover shaped for wrapping the outside of the clamp is formed on the clamp.

An uneven part is formed at a point of an inner part of the cover, to be in close contact with an outer lower surface of the clamp, thereby preventing the clamp from being slipped within the cover when the body portion rotates.

A holder extending upwardly is formed on the cover and the pivot arm is secured to the vehicle body through the holder.

An opening surface is formed toward the vehicle's interior on the body portion, and an extended portion in which an outermost aspect of the body portion is extended toward the opening surface at a predetermined length along a border of the opening surface, is provided on the body portion.

A mirror is inserted into an inward side of the opening surface such that the mirror is prevented from becoming detached from the body by the extended portion.

A door for opening or closing the mirror is provided on the opening surface to be guided by the extended portion when the door is slid.

A ticket holder is formed on a side of the body portion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
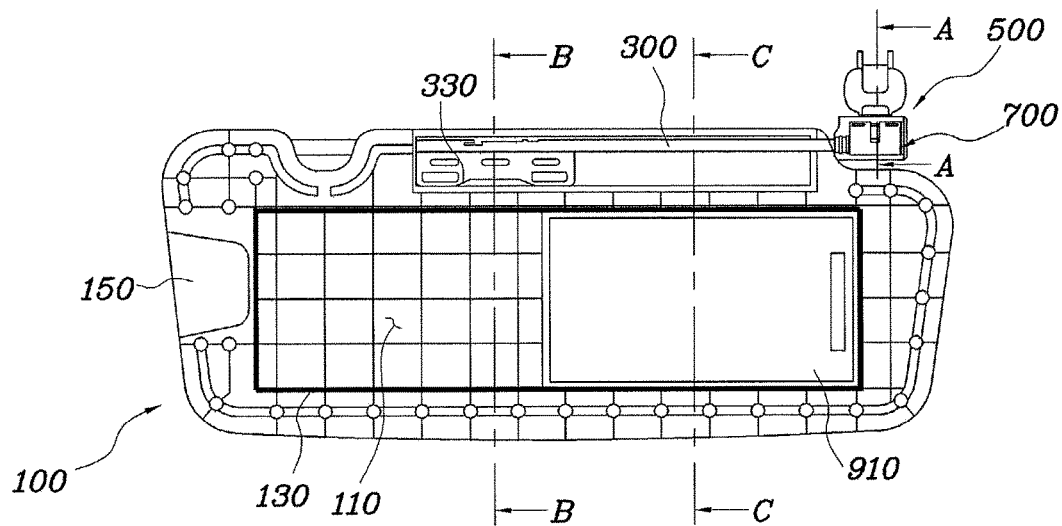
FIG. 1 is an exemplary view of a sun visor for a vehicle according to an exemplary embodiment of the present invention.

It should be understood that the accompanying drawings are not necessarily to scale, presenting a somewhat simplified representation of various exemplary features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the inventions(s) will be described in conjunction with exemplary embodiments, it will be understood that the present description is not intended to limit the invention(s) to those exemplary embodiments. On the contrary, the invention(s) is/are intended to cover the exemplary embodiments as well as various alternatives, modifications, equivalents, and other embodiments, which may be included within the spirit and scope of the invention as defined by the accompanying claims.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a sun visor for a vehicle is described with reference to the accompanying drawings according to an exemplary embodiment of the invention.

Figure 2:
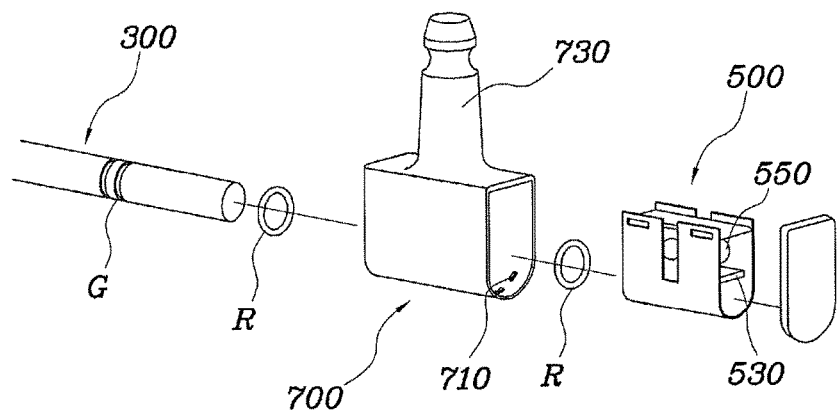
FIG. 2 is an exploded perspective view of a pivot arm, a cover and a clamp of the sun visor shown in FIG. 1, according to an exemplary embodiment of the present invention.
Figure 3:
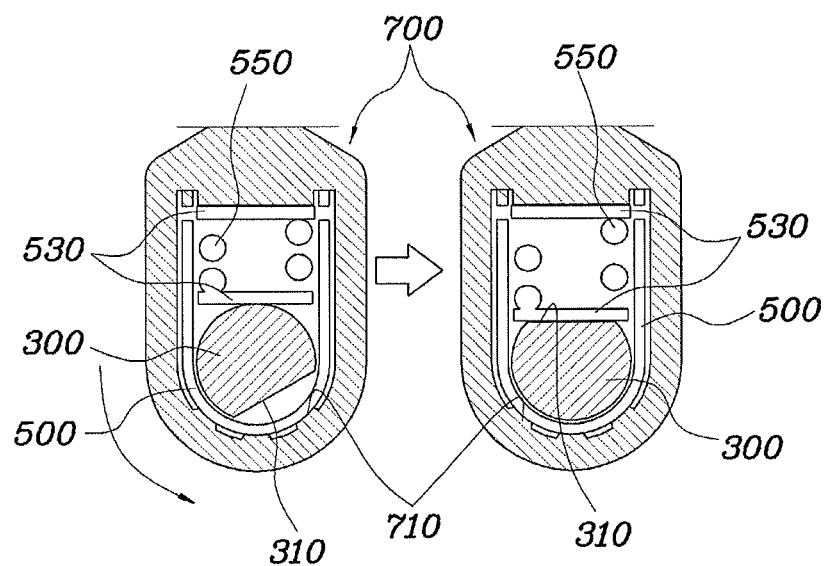
FIG. 3 is an exemplary detailed sectional view of a pivot arm taken along line A-A of FIG. 1 according to an exemplary embodiment of the present invention.
Figure 4:
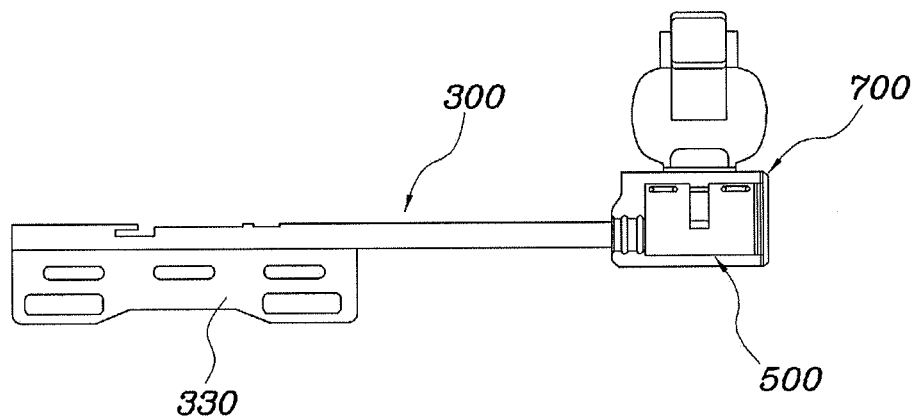
FIG. 4 is an exemplary detailed view of part of a wing unit shown in FIG. 1, according to an exemplary embodiment of the present invention.
Figure 5:
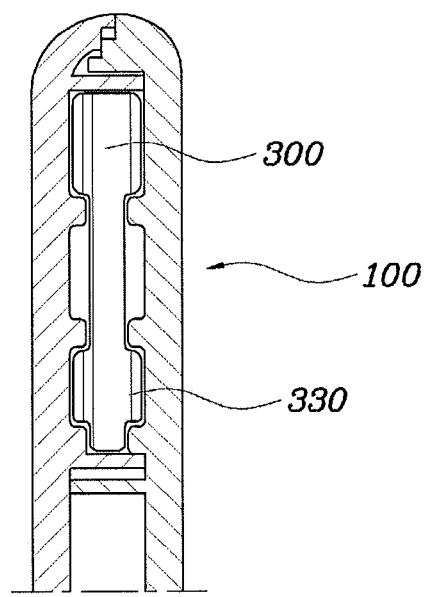
FIG. 5 is an exemplary sectional view of the sun visor body taken along line B-B of FIG. 1 according to an exemplary embodiment of the present invention.
Figure 6:
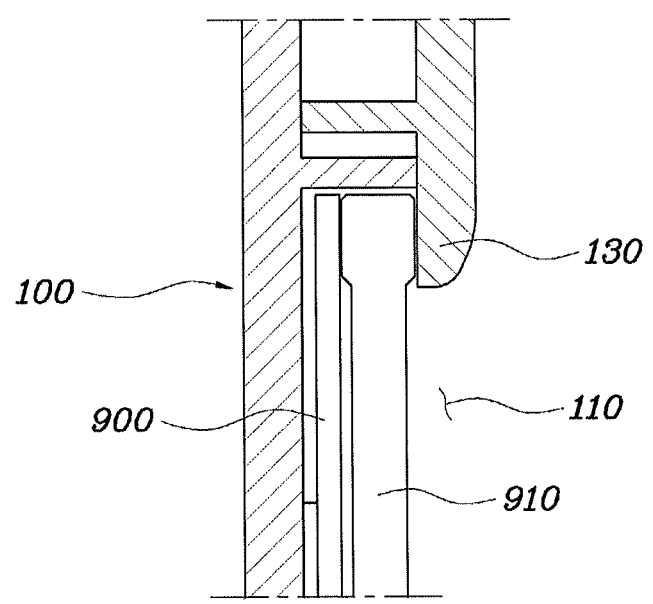
FIG. 6 is an exemplary sectional view taken along line C-C of FIG. 1 according to an exemplary embodiment of the present invention.

FIG. 1 is an exemplary view of a sun visor for a vehicle according to an exemplary embodiment of the present invention. FIG. 2 is an exploded perspective view of a pivot arm 300, a cover 700 and a clamp 500 as shown in FIG. 1, according to an exemplary embodiment of the present invention. FIG. 3 is an exemplary detailed sectional view of a pivot arm taken along line A-A of FIG. 1 according to an exemplary embodiment of the present invention. FIG. 4 is an exemplary detailed view of part of a wing unit 330 according to an exemplary embodiment of the present invention. FIG. 5 is an exemplary sectional view of the sun visor body taken along line B-B of FIG. 1 according to an exemplary embodiment of the present invention. FIG. 6 is an exemplary sectional view taken along line C-C of FIG. 1 according to an exemplary embodiment of the present invention.

A sun visor for a vehicle according to a exemplary embodiment of the present invention includes, a plate-like body portion 100 having a predetermined thickness, a pivot arm 300 wherein one end is secured to a vehicle body and the other end is joined through the upper side of the body portion 100 in a length direction at a section which is cut in a length direction to form a cut section 310, a clamp 500 which is connected sideways to the body 100, is shaped to wrap the pivot arm 300 and on an upper side of which an elastic member 550 is provided to compress the pivot arm 300 when the body portion 100 rotates.

The body portion 100 rotates in either the vertical or horizontal direction around the pivot arm 300 as a central axis of rotation and serves to block sunshine or light from entering the interior space of the vehicle.

According to a related art the pivot arm is bent to form an "L" shape, whereas the pivot arm 300 of the present invention is formed in a "-" shape wherein one end thereof is connected to the clamp 500 and the other end thereof is joined through the body portion 100. Here, a cover 700 shaped for wrapping the outside of the clamp 500 is formed on the clamp 500. A holder 730 extending upwardly is formed on the cover 700 and the pivot arm 300 is connected to a roof panel of a vehicle body by the holder 730 and thus the pivot arm may be connected to a vehicle body by the extended holder 730 to rotate leftward/rightward even though the pivot arm 300 is not connected to the vehicle body with being bent.

The roof panel of the vehicle body and the body portion 100 are spaced apart at least a certain distance by the extended distance of the cover 700 and thus the overlap of the roof panel and body portion 100 is to become minimal. Further, the pivot arm 300 is joined through the lower side of the clamp 500 to space the body portion 100 by a predetermined distance from the vehicle body to prevent the body portion 100 from being in close contact with the vehicle body, thereby blocking more efficiently sunlight and light, etc., from entering the interior space of the vehicle.

The clamp 500 is coupled to one side of the pivot arm 300 and a wing unit 330 that is extended downward and shaped as a key is formed on the other end of the pivot arm to support the body portion 100 not to be vibrated or deviated from the path when the body portion 100 rotates around the pivot arm 300 or extended. Further, the wing unit 330 prevents the body portion 100 from being vibrated or deviated, which is caused from vibration or shock when the vehicle is running due to tolerance and clearance generated during assembly of the body portion 100 and the pivot arm 30.

The wing unit 330 may be formed on one side or both sides of the body portion 100. FIG. 4 shows an illustration of the wing unit 330 formed in the shape of a "W", but since such a design or shape may vary depending on the environment, the shape is not limited to what is specified.

The clamp 500 is coupled to the outer side of the body portion 100 and the elastic member 550 and the supporters 530 of a plate shape provided on the upper and lower sides of the elastic member 550 are provided inside the clamp 500. The supporter 530 serves to support the elastic member 550 when the elastic member 550 compresses the pivot arm 300 in accordance with the rotation of the body portion 100. The elastic member 550 may be a coil spring.

The clamp 300 may be shaped as a rectangular extending vertically wherein the lower surface thereof is shaped as a circular arc with which the outer circumferential surface of the pivot arm 300 is in contact to rotate since the pivot arm 300 is joined through the lower side of the clamp 500. As a result, the supporter 530 provided on the lower side of the clamp becomes close contact with the pivot arm 300 to rotate when the body portion 100 rotates within the clamp 500.

FIG. 2 shows the coupling of a pivot arm 300, a cover 700 and the clamp 500. The clamp 500 is coupled to one side of the pivot arm 300 outside the body portion 100 wherein an uneven surface is formed on the pivot arm 300 and a rubber ring G is connected to the uneven surface, thereby preventing the clamp 500 from being slid toward the body portion 100 after the pivot arm 300 passes through the clamp 500. The cover 700 is connected to the outside of the clamp 500 and the holder 730 of the cover 700 is connected to the roof panel of a vehicle body, thereby allowing the body portion 100 to rotate in vertical and horizontal directions. In addition, as illustrated in FIG. 1 or FIG. 4, the separate anchoring member may be formed in the roof panel of the vehicle body and the holder 730 of the cover 700 may be coupled to the anchoring member.

When the body portion 100 rotates to greater than a predetermined distance, the cut section 310 of the pivot arm 300 meets with one of the supporter 530 and the elastic member 550 compresses the body portion 100 to maintain a rotated state thereof while the cut section 301 is in close face-face contact with the supporter 530.

The uneven part 710 is formed at a point of an inner part of the cover 700, to be in close contact with an outer lower surface of the clamp 500, thereby preventing the clamp 500 from being slipped within the cover 700 when the body portion 100 rotates, which is described in FIG. 3.

Additionally, as shown in FIG. 6, an opening surface 110 is formed toward the vehicle's interior on the body portion 100 and an extended portion 130 in which the outermost aspects of the body portion 100 is extended toward the opening surface 110 at a predetermined length along the border of the opening surface 110 is provided also on the body portion.

That is, an accommodating space is formed on the interior of the body portion 100 and the mirror 900 is inserted in the space. The rear of the mirror 900 may be coupled to the body portion 100 via coupling device. However, the coupling device are not used or used as supplemental coupling device in an exemplary embodiment of the present invention, and the mirror is supported by the extension portion 130 not to be detached from the body portion 100.

A door 910 for opening or closing the mirror 900 is provided on the opening surface 110 of the body portion 100. When the door 910 is opened or closed, the door 910 is guided by the extension portion 130 to be slid thereby not to be detached from the opening surface 110 of the body portion 100. In addition, since a ticket holder 150 is formed on one side of the body portion 100, the convenience of the user is increased.

According to the sun visor for a vehicle as configured above the shielding effect is increased by efficiently blocking sunshine, light, etc., with removing a portion overlapping with the roof panel by forming the sun visor to be spaced from the roof panel of the vehicle body.

In addition, according to the sun visor for a vehicle of the present invention the clamp is not coupled to the body portion itself but to the outer part of the body portion. As a result, through the reduction of the number of component parts and thickness, interior headroom space is increased and aesthetic trends in coupe design are satisfied. Thus, the increase in interior headroom has the advantage of improving livability and brand image. As a result, the structure is simplified, the assembly process becomes shorter, production efficiency increases, and defective write-offs decrease with the overall effect of cost reduction. As follows, the simplified structure shortens the assembly process thereby increasing productivity and decreasing the occurrence of defective products resulting in cost reduction.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sun visor for a vehicle, comprising:
   a plate-like body portion having a predetermined thickness;
   a pivot arm wherein a first end thereof is secured to a vehicle body and a second end thereof is joined through an upper side of the body portion in a length direction at a section which is cut in a length direction to form a cut section;
   a clamp which is connected sideways to the vehicle body and is shaped to wrap the pivot arm;
   an elastic member provided on an upper side of the clamp to compress the pivot arm when the body portion rotates,
   wherein a cover shaped for wrapping the outside of the clamp is formed on the clamp, and
   wherein an uneven part is formed at a point of an inner part of the cover, to be in close contact with an outer lower surface of the clamp, thereby preventing the clamp from being slipped within the cover when the body portion rotates.

2. The sun visor for the vehicle according to claim 1, wherein the pivot arm is joined through a lower side of the clamp to space the body portion from the vehicle body by a predetermined distance.

3. The sun visor for the vehicle according to claim 1,
   wherein the clamp is coupled to a first side of the pivot arm; and
   wherein a wing unit extending downwardly is formed on a second side of the pivot arm to support the body portion when the body portion rotates around the pivot arm.

4. The sun visor for the vehicle according to claim 3, wherein wing units are formed on both side surfaces of the body portion, respectively.

5. The sun visor for the vehicle according to claim 1, further including:
   supporters having a plate shape provided inside the clamp and mounted on upper and lower sides of the elastic member, wherein one of the supporters are selectively engaged to the cut section of the pivot arm.

6. The sun visor for the vehicle according to claim 1, wherein a holder extending upwardly is formed on the cover and the pivot arm is secured to the vehicle body through the holder.

7. The sun visor for the vehicle according to claim 1,
   wherein an opening surface is formed toward the vehicle's interior on the body portion; and
   wherein an extended portion in which an outermost aspect of the body portion is extended toward the opening surface at a predetermined length along a border of the opening surface, is provided on the body portion.

8. The sun visor for the vehicle according to claim 7, wherein a mirror is inserted into an inward side of the opening surface such that the mirror is prevented from becoming detached from the body by the extended portion.

9. The sun visor for the vehicle according to claim 8, wherein a door for opening or closing the mirror is provided on the opening surface to be guided by the extended portion when the door is slid.

10. The sun visor for the vehicle of claim 1, wherein a ticket holder is formed on a side of the body portion.

\* \* \* \* \*